United States Patent
Bui

(10) Patent No.: US 9,360,030 B2
(45) Date of Patent: Jun. 7, 2016

(54) ASSEMBLY OF AN ELONGATE THIN LIP IN AN ELONGATE NARROW SLIT AND USE FOR ASSEMBLING AN AIR GUIDE ONTO A SHROUD

(71) Applicant: RENAULT s.a.s., Boulogne-Billancourt (FR)

(72) Inventor: Joseph Bui, Les Mureaux (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/770,590

(22) PCT Filed: Feb. 4, 2014

(86) PCT No.: PCT/FR2014/050206
§ 371 (c)(1),
(2) Date: Aug. 26, 2015

(87) PCT Pub. No.: WO2014/131957
PCT Pub. Date: Sep. 4, 2014

(65) Prior Publication Data
US 2016/0003273 A1    Jan. 7, 2016

(30) Foreign Application Priority Data
Feb. 26, 2013   (FR) ...................................... 13 51705

(51) Int. Cl.
*F16B 5/00*    (2006.01)
*F16B 5/06*    (2006.01)

(52) U.S. Cl.
CPC ........... *F16B 5/0012* (2013.01); *F01P 2070/52* (2013.01); *F16B 5/0642* (2013.01)

(58) Field of Classification Search
None
See application file for complete search history.

(56) References Cited

U.S. PATENT DOCUMENTS

2011/0280719 A1 *   11/2011   Farlow .................. F04D 29/526
415/208.1

FOREIGN PATENT DOCUMENTS

| DE | 89 10 424     |         | 7/1990 |           |
|----|---------------|---------|--------|-----------|
| DE | 10350231 A1 * | 5/2005  |        | B21D 26/033 |
| FR | 2 816 378     |         | 5/2002 |           |

OTHER PUBLICATIONS

French Search Report Issued Oct. 14, 2013 in French Patent Application No. 1351705 Filed Feb. 26, 2013.
International Search Report Issued May 26, 2014 in PCT/FR2014/050206 Filed Feb. 4, 2014.

* cited by examiner

*Primary Examiner* — Victor MacArthur
(74) *Attorney, Agent, or Firm* — Oblon, McClelland, Maier & Neustadt, L.L.P.

(57) ABSTRACT

An assembly of a first element, such as a fan shroud, with a second element, such as an air guide, realized by assembling an elongate thin lip belonging to the second element in an elongate narrow slit formed by the three sides of an elongate planar plate attached in parallel to a planar wall of the first element. The elongate thin lip includes a concave edge and includes, at either side thereof, extended tips, and the elongate slit includes, at either side thereof, areas in which the thickness of the slit is increased, configured to engage with the extended tips of the lip so that the insertion of the lip into the slit begins by inserting the tips into the areas and then continues with gradual insertion of the rest of the concave edge of the lip as the lip is being advanced.

5 Claims, 2 Drawing Sheets

ASSEMBLY OF AN ELONGATE THIN LIP IN AN ELONGATE NARROW SLIT AND USE FOR ASSEMBLING AN AIR GUIDE ONTO A SHROUD

BACKGROUND

The present invention concerns the assembly of a relatively thin elongate lip in a relatively narrow elongate slit, and its use for assembling an air guide on a shroud.

In a number of applications, it is necessary to encase one element in another, the first element having at least one wall terminating in a lip or relatively thin elongate leaf which must be tightly held in an elongate slit formed in the second element. This is the case for example in the field of automotive construction when a motorized fan unit shroud must encase the top and bottom walls of an air guide; at the high and low point, the shroud comprises horizontal parallel walls on which parallel plates are attached to the wall by a long side, forming elongate slits of small thickness open on three sides; at the upper and lower part, the air guide comprises two elongate lips with rectilinear edges which must be inserted in the narrow parallel slits of the shroud; following this encasing, the air guide is finally fixed to the shroud by suitable complementary clipping elements. The insertion of one part into the other proves difficult for the fitter because the air guide is a relatively large and flexible part which deforms when handled, and it is therefore not easy to align correctly the zones to be clipped together.

BRIEF SUMMARY

The object of the invention is to propose an assembly of a relatively thin elongate lip in a relatively narrow, elongate three-sided slit, for which the insertion of one element into the other is facilitated.

The object achieves its aim thanks to an assembly of a first element with a second element produced by assembling an elongate thin lip belonging to the second element in an elongate narrow slit formed by the three sides of an elongate planar plate attached in parallel to a planar wall of the first element, characterized in that in the direction of the first element, the elongate thin lip has a concave edge and terminates laterally in extended tips, and in that the elongate slit laterally comprises two zones in which the thickness of the slit is increased, arranged to cooperate with the extended tips of the edge such that insertion of the lip into the slit begins by insertion of the tips into said zones and then continues with the gradual insertion of the rest of the concave edge of the lip as the lip advances.

Advantageously, each zone of increased thickness of the slit is formed by an outwardly horned part of the corners of the plate forming the slit, such that this horned part serves as a progressive guide for the extended tips of the edge of the thin lip when the lip is inserted into the slit.

Advantageously, the concave edge is curvilinear, i.e. it takes the form of an arc of a circle or ellipse or a similar curve.

Advantageously, the assembly of the first element with the second element takes place by assembling two lips of the second element in two elongate slits formed on two parallel opposing walls of the first element.

According to a preferred application, the assembly is the assembly of an air guide on a fan shroud in a motor vehicle.

BRIEF DESCRIPTION OF THE DRAWINGS

Further characteristics and advantages of the invention will arise from the description below of an exemplary embodiment. Reference is made to the attached drawings on which.

DETAILED DESCRIPTION

The assembly according to the invention proposes the encasing of an air guide 1 (second element) in the shroud 2 (first element) of a motorized fan unit 3.

Figure 1:
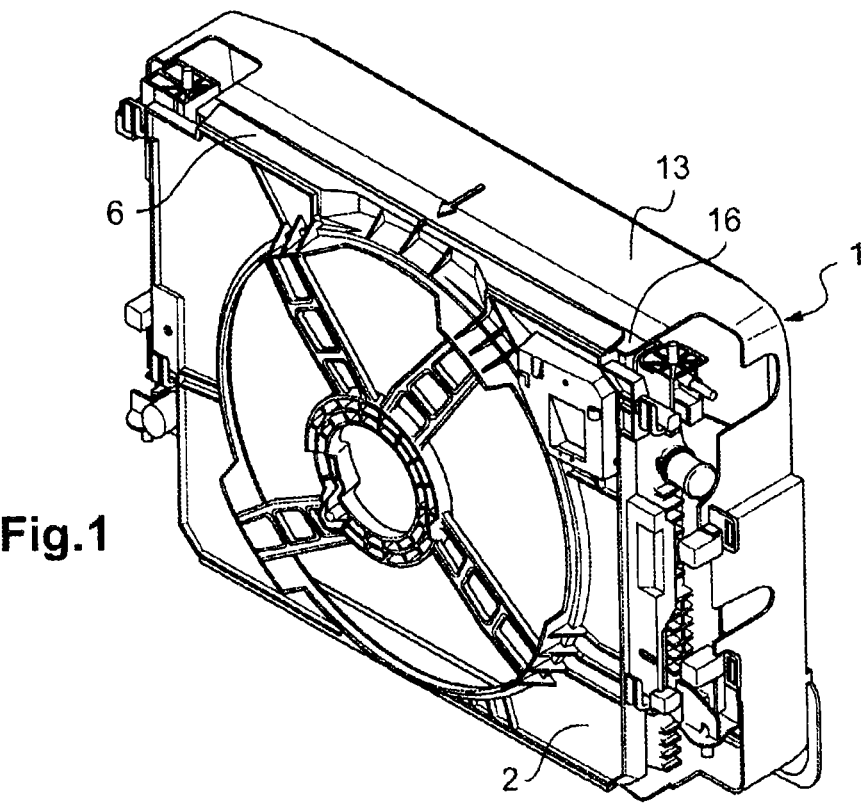
FIG. 1 is a perspective, three-quarter rear view of a fan shroud and an air guide assembled with the shroud by encasing.
Figure 2:
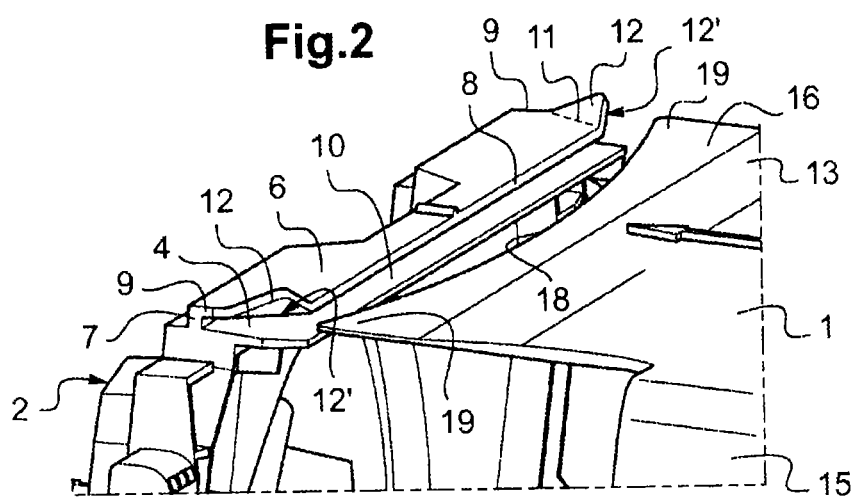
FIGS. 2 and 3 are detailed, perspective, three-quarter front views of the top part of the shroud and air guide of FIG. 1, respectively in the approach position and in the encasing position.
Figure 3:
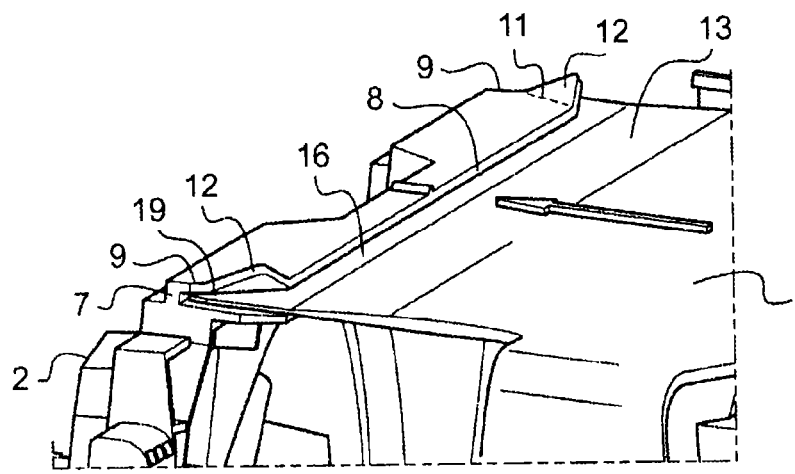
Figure 4:
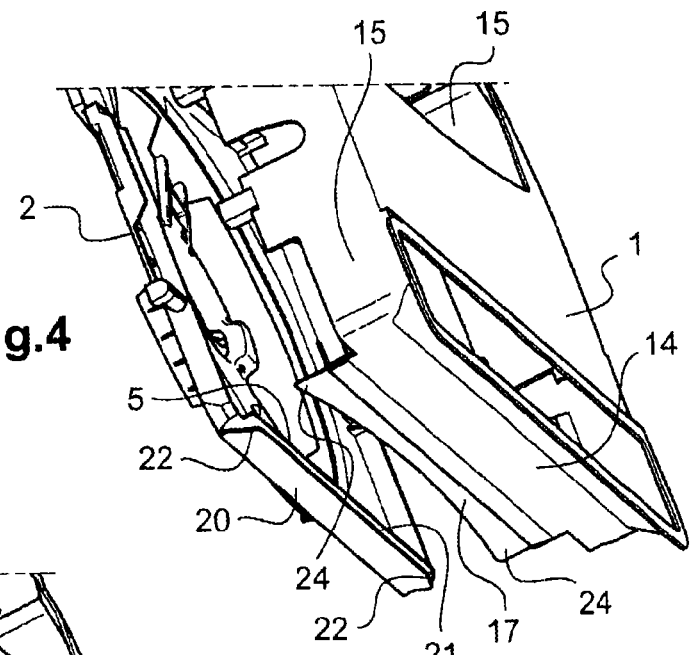
FIGS. 4 and 5 are detailed, perspective views from below and from the front of the bottom part of the shroud and the air guide of FIG. 1, respectively in the approach position and in the encasing position.

The shroud 2 takes the form of a rigid rectangular frame with two horizontal walls at the top 4 and bottom (FIGS. 2 to 4). On the top wall 4, an elongate parallel rectangular plate 6 is attached to the wall 4 via a connecting foot 7 along the long side of the plate 6; the other three sides of the plate 6 (another long side 8 and two short sides 9) form the open edges of a horizontal slit (10) open at the front (i.e. towards the air guide 1) and the side. According to the invention, the front corners 12 of the plate 6 are "horned", i.e. raised up along a "fold" 11 arranged diagonally. We see that the horizontal slit 10 has a thickness which is substantially constant over its entire extent except in the zones 12' formed by these corners 12 where the thickness of the slit increases in the direction of the angle.

The air guide 1 takes the form of a rectangular frame essentially comprising the horizontal top wall 13 and bottom wall 14 connected by vertical sides 15. The horizontal walls 13 and 14 terminate at the rear in a rear lip 16 and 17 respectively which is directed towards the shroud 2 and which must be inserted relatively tightly in the respective slits of said shroud 2. According to the invention, the rear lip 16 is curvilinear and concave towards the rear, such that in the direction of the shroud 2, it forms an edge 18 in the form of an arc of an ellipse which terminates laterally in two lateral extended tips 19. When the air guide 1 and the shroud 2 are placed in front of each other (FIG. 2), the fitter places the tips 19 of the curvilinear edge 18 opposite the zones of increased thickness formed by the raised corners 12, which is relatively easy, such that by continuing the approach movement of one element to the other, these tips 19 can come to rest against the lower surface of said raised corners 12 and be guided gradually by said surface towards the zones of nominal thickness of the slit 10. At the same time, the curvilinear form of the edge 18 allows the rest of the lip 16 to advance gradually and without difficulty, and be inserted in the slit 10.

Figure 5:
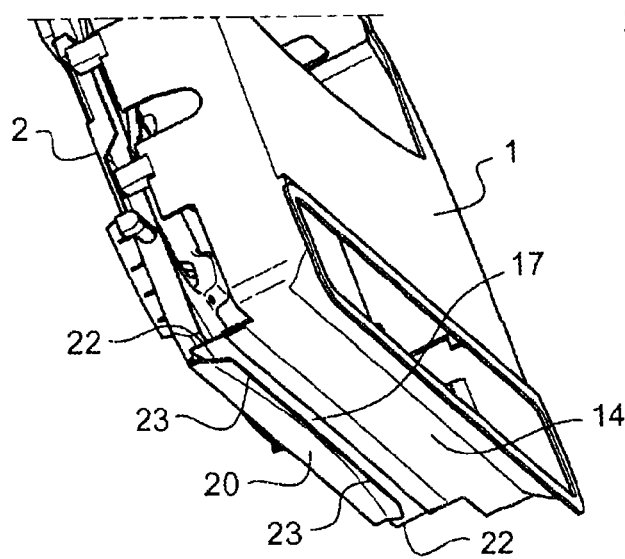

The same arrangements are made for the lower parts of the two elements, as is shown on FIGS. 4 and 5. There, below the bottom horizontal wall 5 of the shroud, a plate 20 defines a horizontal slit 21 which is open at three sides and intended to receive the lower rear lip 17 of the air guide 1. The plate also comprises two raised corners 22 which may take a different shape from the raised corners of the upper plate 6. In the exemplary embodiment shown in FIGS. 4 and 5, the corners 22 are raised relatively strongly at their lateral ends but extend towards the middle of the plate via a progressive raised area 23. The principle of insertion of the lip 17 into the slit 21 is, however, totally identical to that which has been shown for the top part of the device: the lateral tips 24 begin to be firstly inserted in the parts of the slit of increased thickness at the level of the raised corners 22, until finally the lip 17 is introduced in the slit 21 over its entire width.

The insertion of the top lip 16 in the slit 10 and the bottom lip 17 in the slit 21 preferably takes place simultaneously, until locking clips (not shown) lock the first element 2 in the second element 1. It is provided that in this locking position, the edge 18 of the top lip 16 is not in contact with the base of the receiving zone formed by the slit 10, and the same applies to the bottom part of the device.

The invention claimed is:

1. An assembly comprising:
 a first element with a second element produced by assembling an elongate thin lip belonging to the second element in an elongate narrow slit formed by three sides of an elongate planar plate attached in parallel to a planar wall of the first element,
 wherein in the direction of the first element, the elongate thin lip includes a concave edge and terminates laterally in extended tips, and
 wherein the elongate slit laterally comprises two zones in which the thickness of the slit is increased, configured to cooperate with the extended tips of the lip, such that insertion of the lip into the slit begins by insertion of the tips into the zones and then continues with gradual insertion of the rest of the concave edge of the lip as the lip advances.

2. The assembly as claimed in claim 1, wherein each zone of increased thickness of the slit is formed by an outwardly horned part of corners of the plate forming the slit.

3. The assembly as claimed in claim 1, wherein the concave edge is curvilinear.

4. The assembly as claimed in claim 1, further produced by assembling an additional elongate thin lip belonging to the second element in an additional elongate narrow slip on an additional wall of the first element, the wall and the additional wall being parallel and opposing.

5. The assembly as claimed in claim 1, wherein the first element is a fan shroud, the second element is an air guide, and the assembly is in a motor vehicle.

\* \* \* \* \*